(12) United States Patent
Ljubuncic et al.

(10) Patent No.: US 9,424,142 B2
(45) Date of Patent: Aug. 23, 2016

(54) HARDWARE-ASSISTED APPLICATION CHECKPOINTING AND RESTORING

(71) Applicant: Intel Corporation, Santa Clara, CA (US)

(72) Inventors: Igor Ljubuncic, Yokneam Ilit (IL); Ravi A. Giri, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 14/340,039

(22) Filed: Jul. 24, 2014

(65) Prior Publication Data

US 2016/0026546 A1    Jan. 28, 2016

(51) Int. Cl.
  *G06F 11/00*    (2006.01)
  *G06F 11/14*    (2006.01)
  *G06F 11/36*    (2006.01)

(52) U.S. Cl.
  CPC ....... *G06F 11/1469* (2013.01); *G06F 11/1407* (2013.01); *G06F 11/1446* (2013.01); *G06F 11/1456* (2013.01); *G06F 11/1471* (2013.01); *G06F 11/3648* (2013.01)

(58) Field of Classification Search
  CPC ........... G06F 11/1407; G06F 11/1469; G06F 11/1471; G06F 11/1446; G06F 11/1456; G06F 11/3648
  See application file for complete search history.

(56) References Cited

U.S. PATENT DOCUMENTS

| | | | | |
|---|---|---|---|---|
| 4,814,971 A * | 3/1989 | Thatte | ......... | G06F 11/1438 714/15 |
| 5,870,607 A * | 2/1999 | Netzer | ......... | G06F 11/3414 714/E11.193 |
| 6,708,288 B1 * | 3/2004 | Ziegler | ......... | G06F 11/1407 714/15 |
| 6,718,538 B1 * | 4/2004 | Mathiske | ......... | G06F 11/1438 714/E11.13 |
| 7,512,769 B1 * | 3/2009 | Lowell | ......... | G06F 9/461 711/165 |
| 8,966,315 B2 * | 2/2015 | Burn | ......... | G06F 11/1446 711/173 |
| 9,256,496 B1 * | 2/2016 | Havemose | ......... | G06F 11/1412 |
| 2002/0062389 A1 * | 5/2002 | Vertes | ......... | G06F 9/54 709/238 |
| 2005/0257080 A1 * | 11/2005 | Santos | ......... | G06F 11/1438 714/5.11 |

(Continued)

*Primary Examiner* — Joshua P Lottich
(74) *Attorney, Agent, or Firm* — Barnes & Thornburg LLP

(57) ABSTRACT

Technologies for hardware-assisted application checkpointing include a computing device having a processor with hardware checkpoint support. In response to encountering a checkpoint event during execution of an application, the computing device saves the execution state of the application to nonvolatile storage using the hardware checkpoint support. The computing device may also restore the execution state using the hardware checkpoint support. The hardware checkpoint support may save part or all of the virtual memory space of the application in a manner transparent to the executing process. The hardware checkpoint support may be invoked using one or more system hooks such as system calls or processor instructions. The computing device may monitor for checkpoint events using hardware event monitors of the processor, chipset, or other components of the computing device. The computing device may store execution state in a dedicated flash memory cache. Other embodiments are described and claimed.

22 Claims, 2 Drawing Sheets

(56) References Cited

U.S. PATENT DOCUMENTS

| | | | | |
|---|---|---|---|---|
| 2008/0201602 A1* | 8/2008 | Agarwal | G06F 11/2097 | 714/4.1 |
| 2010/0325500 A1* | 12/2010 | Bashir | G06F 11/1612 | 714/746 |
| 2011/0066831 A1* | 3/2011 | Blundell | G06F 11/1407 | 712/228 |
| 2011/0167195 A1* | 7/2011 | Scales | G06F 9/45558 | 711/6 |
| 2012/0011401 A1* | 1/2012 | Ranganathan | G06F 11/1484 | 714/19 |
| 2013/0305087 A1* | 11/2013 | Catthoor | G06F 11/14 | 714/15 |
| 2013/0332660 A1* | 12/2013 | Talagala | G06F 12/0246 | 711/103 |
| 2015/0154081 A1* | 6/2015 | Javadekar | G06F 11/2097 | 707/639 |
| 2015/0242279 A1* | 8/2015 | Busaba, III | G06F 11/1407 | 714/13 |
| 2015/0242280 A1* | 8/2015 | Busaba | G06F 11/1407 | 714/13 |
| 2015/0278025 A1* | 10/2015 | Khartikov | G06F 9/30145 | 714/15 |

* cited by examiner

HARDWARE-ASSISTED APPLICATION CHECKPOINTING AND RESTORING

BACKGROUND

Many large-scale computing environments such as high-performance computing and cloud computing environments may incorporate long-running and highly dependent processes. Crashes or other errors occurring in the course of such long-running processes may cause the loss of application state and thus may require large amounts of computational work to be repeated. Accordingly, crashes in large-scale computing environments may be quite costly and time-consuming.

Some typical computing environments support software-based application checkpointing. Application checkpointing allows the computing environment to store periodic snapshots of the state of a running application. The application may be resumed or replayed starting from the state of a saved checkpoint, which may allow for quicker or less-expensive crash recovery. Typical checkpointing solutions are purely software-based. Thus, software checkpointing support may have to be specifically re-engineered for each supported application and/or operating system. Software virtualization solutions such as hypervisors and virtual machine monitors also typically support creating and restoring snapshots of virtual machines, which may provide similar functionality.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
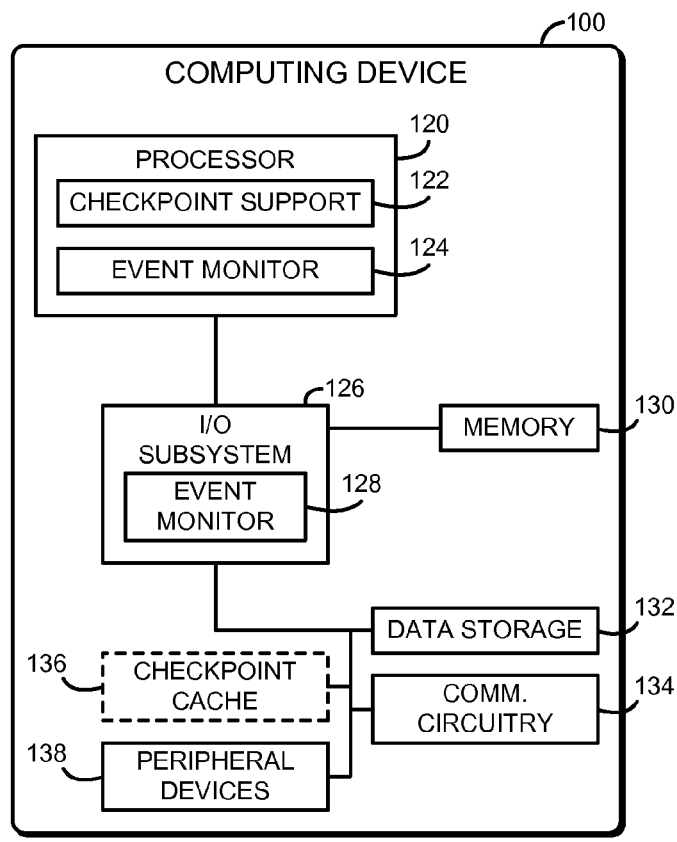
FIG. 1 is a simplified block diagram of at least one embodiment of a computing device for hardware-assisted application checkpointing and restoring.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment a computing device 100 includes a processor with hardware checkpoint support. The computing device 100 executes one or more applications and, in response to detecting a checkpoint event, saves an application checkpoint using the hardware checkpoint support. Checkpoint events may be generated by hardware event monitors included in the processor, chipset, or other components of the computing device 100. The application checkpoints may be stored in a dedicated cache memory of the computing device 100 to improve performance. The computing device 100 may also restore the application checkpoint using the hardware checkpoint support of the processor and resume executing the application. Hardware checkpointing support may allow for improved checkpointing performance, reliability, and scalability compared to software-only implementations. Additionally, because hardware checkpointing may be transparent to executing applications, checkpointing support may be provided for existing applications without requiring re-engineering such as code modifications or recompilations.

The computing device 100 may be embodied as any type of computation or computer device capable of performing the functions described herein, including, without limitation, a computer, a multiprocessor system, a server, a rack-mounted server, a blade server, a smartphone, a tablet computer, a laptop computer, a notebook computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 126, a memory 130, a data storage device 132, and communication circuitry 134. Of course, the computing device 100 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. The processor 120 illustratively includes hardware checkpoint support 122 and a hardware event monitor 124. The hardware checkpoint support 122 may be embodied as any hardware component, microcode, firmware, or other component of the processor 120 capable of saving the execution state of a currently executing application. For example, the hardware checkpoint support 122 may be embodied as one or more dedicated processor instructions and associated memory management functions of the processor 120 that causes all or part of the virtual memory space of the current application to be saved to nonvolatile storage. The hardware event monitor 124 may be embodied as any hardware component, microcode, firmware, or other component of the processor 120 capable of notifying software executed by the processor 120 of system events occurring within the processor 120, such as memory access events or cache access events. For example, the hardware event monitor 124 may be embodied as one or more performance counters, performance monitoring units, cache monitoring units, or other hardware counters of the processor 120.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. The memory 130 is communicatively coupled to the processor 120 via the I/O subsystem 126, which may be embodied as circuitry and/or components to facilitate input/output operations with the processor 120, the memory 130, and other components of the computing device 100. For example, the I/O subsystem 126 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 126 further includes a hardware event monitor 128. Similar to the hardware event monitor 124 of the processor 120, the hardware event monitor 128 may be embodied as any hardware component, microcode, firmware, or other component of the I/O subsystem 126 that is capable of notifying software executed by the processor 120 of system events occurring within the computing device 100, such as I/O events, memory access events, network access events, or other system events. For example, the hardware event monitor 128 may be embodied as one or more performance counters, performance monitoring units, or other hardware counters of the I/O subsystem 126. In some embodiments, the I/O subsystem 126 may form a portion of a system-on-a-chip (SoC) and be incorporated, along with the processor 120, the memory 130, and other components of the computing device 100, on a single integrated circuit chip.

The data storage device 132 may be embodied as any type of device or devices configured for short-term or long-term storage of data such as, for example, memory devices and circuits, memory cards, hard disk drives, solid-state drives, or other data storage devices. In use, as described below, the data storage device 132 may store application checkpointing data such as saved execution states or other, similar data. The communication circuitry 134 of the computing device 100 may be embodied as any communication circuit, device, or collection thereof, capable of enabling communications between the computing device 100 and remote devices over a network (not shown). The communication circuitry 134 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 100 may also include a checkpoint cache 136. Similar to the data storage device 132, the checkpoint cache 136 may be embodied as any type of device or devices configured for short-term or long-term storage of data such as, for example, memory devices and circuits, memory cards, hard disk drives, solid-state drives, or other data storage devices. For example, in some embodiments the checkpoint cache 136 may be embodied as a relatively small amount of flash memory storage. The checkpoint cache 136 may store application checkpointing data such as saved execution states or other similar data.

In some embodiments, the computing device 100 may also include one or more peripheral devices 138. The peripheral devices 138 may include any number of additional input/output devices, interface devices, and/or other peripheral devices. For example, in some embodiments, the peripheral devices 138 may include a display, touch screen, graphics circuitry, keyboard, mouse, speaker system, and/or other input/output devices, interface devices, and/or peripheral devices.

Figure 2:
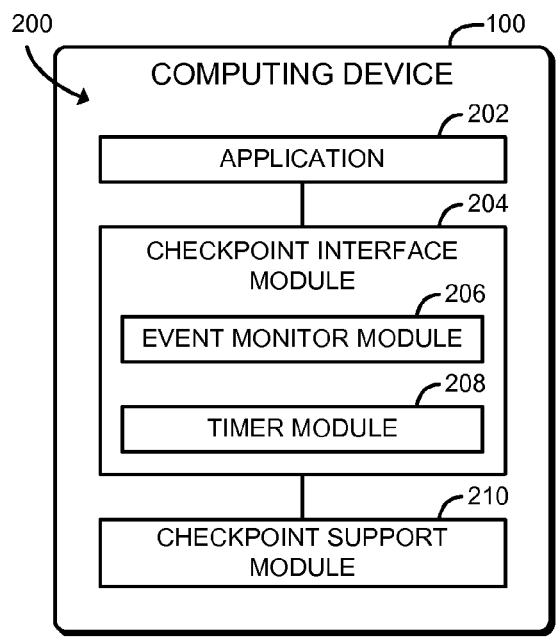
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes an application 202, a checkpoint interface module 204, and a checkpoint support module 210. The various modules of the environment 200 may be embodied as hardware, firmware, software, or a combination thereof The application 202 may be embodied as any program, process, task, or other executable component of the computing device 100. For example, the application 202 may be embodied as a process, a thread, a native code application, a managed code application, a virtualized application, a virtual machine, or any other similar application. In some embodiments, the application 202 may be compiled to target the processor 120 specifically; that is, the application 202 may include code to access the hardware checkpoint support 122 such as specialized processor instructions. During execution, the application 202 maintains and modifies an execution state that may include data such as, for example, virtual memory contents, processor register state, processor flags, process tables, file descriptors, file handles, or other data structures relating to the current state of the application 202. Although illustrated as a single application 202, it should be understood that the environment 200 may include one or more applications 202 executing contemporaneously.

The checkpoint interface module 204 is configured to detect and handle occurrences of checkpoint events encountered during execution of the application 202. Checkpoint events may include system events such as events generated by the hardware event monitors 124, 128 or timer events. In response to detecting checkpoint events, the checkpoint interface module 204 may call one or more system hooks to cause the computing device 100 to save a checkpoint, restore a checkpoint, or perform other checkpointing operations. System hooks may include, for example, system calls or processor instructions. In some embodiments, those functions may be performed by one or more sub-modules, such as an event monitor module 206 or a timer module 208.

The checkpoint support module 210 is configured to save the execution state of the application 202 in response to the checkpoint interface module 204 detecting and handling a checkpoint event. The checkpoint support module 210 is also configured to restore the execution state of the application 202. The checkpoint support module 210 uses the hardware checkpoint support 122 of the processor 120 to save and/or restore the execution state. In some embodiments, the execution state of the application 202 may be stored in the checkpoint cache 136. The checkpoint interface module 204 and/or the checkpoint support module 210 may be embodied as one or more libraries, operating system drivers, or operating system components of the computing device 100. Additionally or alternatively, the checkpoint interface module 204 and/or the checkpoint support module 210 may be embodied as one or more components of a virtualization framework of the computing device 100 such as a hypervisor or virtual machine monitor (VMM).

Figure 3:
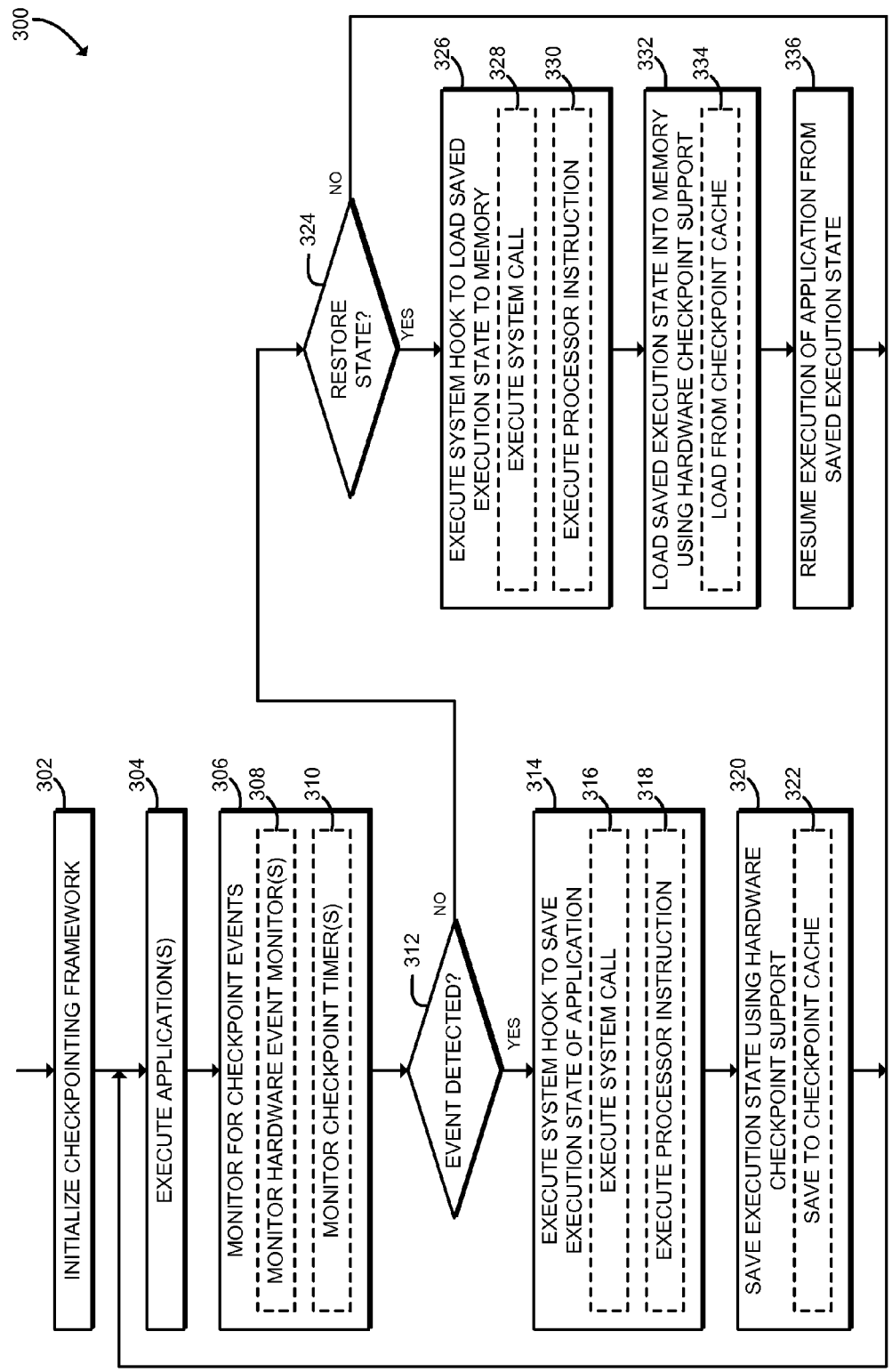
FIG. 3 is a simplified flow diagram of at least one embodiment of a method for hardware-assisted process checkpointing and restoring that may be executed by the computing device of FIGS. 1 and 2.

Referring now to FIG. 3, in use, the computing device 100 may execute a method 300 for hardware-assisted application checkpointing and restoring. The method 300 begins in block 302, in which the computing device 100 initializes a checkpointing framework. The checkpointing framework may include any hardware, firmware, or software functionality used to save and restore application checkpoints. During initialization, the computing device 100 may perform any initialization routines or other processes required to activate the hardware checkpoint support 122, as well as any required software initialization routines. For example, the computing device 100 may initialize interrupt vectors, timers, or other system hooks used to invoke the hardware checkpoint support 122.

In block 304, the computing device 100 executes one or more applications 202 that may be managed by the checkpointing framework. As described above, the applications 202 may be embodied as any process, thread, managed code, or other task executed by the computing device 100. In some embodiments, the applications 202 may be embodied as virtualized applications, for example as applications or operating systems executed by a hypervisor of the computing device 100. During execution, the applications 202 may perform calculations, update regions of the memory 130, or perform any other operations typical of a computer application.

In block 306, the computing device 100 monitors for checkpoint events during execution of the applications 202. A checkpoint event may be embodied as any hardware or software event that triggers a checkpointing operation. The computing device 100 may use any technique to monitor for checkpoint events, including polling for events, handling interrupts, registering callback functions or event listeners, or other techniques. The checkpoint event may be embodied as a hardware event such as an interrupt, a memory access, or an I/O operation; as a software event such as a modification of a data structure in memory; as a user-generated event such as an application programming interface (API) call, or as any other event. In some embodiments, in block 308, the computing device 100 may monitor the hardware event monitors 124, 128 for checkpoint events. For example, the computing device 100 may monitor the hardware event monitor 124 for accesses to a last-level cache of the processor 120. As another example, the computing device 100 may monitor the hardware event monitor 128 for writes to one or more predefined memory address ranges or for network I/O events. Additionally or alternatively, in some embodiments, in block 310 the computing device 100 may monitor one or more checkpoint timers to determine whether any timers have elapsed. Thus, in addition to system-event-based checkpointing, in some embodiments the computing device 100 may perform time-based checkpointing.

In block 312, the computing device 100 determines whether a checkpoint event has been detected. If not, the method 300 branches ahead to block 324, described below. If a checkpoint event has been detected, the method 300 advances to block 314.

In block 314, the computing device 100 executes a system hook to save the execution state of a currently executing application 202. The system hook may be embodied as any technique usable to invoke the hardware checkpoint support 122 of the processor 120. Different software executing on the same computing device 100 may execute different system hooks. For example, the system hook executed may depend on whether the software has been designed to take advantage of the hardware checkpoint support 122. Additionally or alternatively, the system hook executed may depend on the relative performance characteristics of different system hooks, or on any other criteria. In some embodiments, in block 316, the computing device 100 may execute a system call to save the execution state. The system call may be embodied as any operating system or driver routine allowing an application or library executed by the computing device 100 to request saving the execution state. For example, the system call may be embodied as a predefined software interrupt (e.g., INT 0x80) or a virtual system call (e.g., a Linux vsyscall). Additionally or alternatively to executing a system call, in some embodiments, in block 318 the computing device 100 may execute a processor instruction to cause the processor 120 to save the execution state. In some embodiments, that processor instruction may be executed by the checkpoint interface module 204. Additionally or alternatively, in some embodiments that processor instruction may be directly executed by the application 202, for example when other software of the computing device 100 has not been compiled to target the processor 120 or otherwise does not recognize the hardware checkpoint support 122.

After executing the system hook, in block 320 the computing device 100 saves the execution state of the application 202 using the hardware checkpoint support 122. As described above, the execution state of the application 202 may include any data related to the current state of the application 202. Thus, to save the execution state, the computing device 100 may copy part or all of the virtual address space of the application 202 to nonvolatile storage such as the data storage device 132. For example, the computing device 100 may store the stack, the heap, the allocated pages, the process table, or other parts of the memory 130. The computing device 100 may use data compression, copy-on-write, or other techniques to reduce the amount of storage space required to save the application state. In some embodiments, the computing device 100 may also store metadata related to the current state of the application 202 that is not stored within the virtual address space of the application 202. The computing device 100 may also store state data associated with the processor 120 such as register state or processor flags. By using the hardware checkpoint support 122, the execution state of the application 202 may be stored transparently to the application 202. In some embodiments, in block 322 the computing device 100 may save the application state to the checkpoint cache 136. As described above, saving the application state to the checkpoint cache 136 may improve performance of the checkpointing process. After saving the execution state, the method 300 loops back to block 304 to continue executing the applications 202.

Referring back to block 312, if no checkpoint event is detected, the method 300 branches to block 324, in which the computing device 100 determines whether to restore the execution state of an application 202. The computing device 100 may restore the execution state in response to, for example, an API request to restore execution state, a system event, a timer expiration, or any other appropriate restore event. If the computing device 100 determines not to restore application state, the method 300 loops back to block 304 to continue executing the applications 202. If the computing device 100 determines to restore the execution state, the method 300 advances to block 326.

In block 326, the computing device 100 executes a system hook to load the saved execution state of the requested application 202 into the memory 130. Similar to saving the execution state, the system hook for loading the execution state may be embodied as any technique usable to invoke the hardware checkpoint support 122 of the processor 120. Different software executing on the same computing device 100 may execute different system hooks. For example, the system hook executed may depend on whether the software has been designed to take advantage of the hardware checkpoint support 122. Additionally or alternatively, the system hook executed may depend on the relative performance characteristics of different system hooks, or on any other criteria. In some embodiments, in block 328, the computing device 100 may execute a system call to load the execution state. As described above, the system call may be embodied as any operating system or driver routine allowing an application or library executed by the computing device 100 to request loading the execution state. For example, the system call may be embodied as a predefined software interrupt (e.g., INT 0x80) or a virtual system call (e.g., a Linux vsyscall). Additionally or alternatively to executing a system call, in some embodiments, in block 330 the computing device 100 may execute a processor instruction to cause the processor 120 to load the execution state. In some embodiments, that processor instruction may be executed by the checkpoint interface module 204. Additionally or alternatively, in some embodiments that processor instruction may be directly executed by the application 202, for example when other software of the computing device 100 has not been compiled to target the processor 120 or otherwise does not recognize the hardware checkpoint support 122.

In block 332, the computing device 100 loads the execution state of the application 202 into the memory 130 using the hardware checkpoint support 122. To load the execution state, the computing device 100 may copy data from non-volatile storage such as the data storage device 132 into the virtual memory space of the application 202. For example, the computing device 100 may load data indicative of the saved execution state of the application 202 such as the stack, the heap, the process table, the allocated pages, or other parts of the memory 130. As described above, the computing device 100 may use data compression, copy-on-write, or other techniques to reduce the amount of storage space required to load the execution state. In some embodiments, the computing device 100 may also load metadata related to the saved state of the application 202. The computing device 100 may also restore state data associated with the processor 120 such as register state or processor flags. In some embodiments, in block 334 the computing device 100 may load the execution state from the checkpoint cache 136. Loading the application state from the checkpoint cache 136 may improve performance of the checkpointing process.

After loading the execution state, in block 336 the computing device 100 resumes execution of the application 202 from the saved execution state. By using the hardware checkpoint support 122, execution of the application 202 may be resumed transparently to the application 202; in other words, the application 202 may not be aware that it was loaded from a saved checkpoint. After resuming the application 202, the method 300 loops back to block 304 to continue executing the applications 202.

EXAMPLES

Illustrative examples of the technologies disclosed herein are provided below. An embodiment of the technologies may include any one or more, and any combination of, the examples described below.

Example 1 includes a computing device for hardware-assisted application checkpointing, the computing device comprising a processor comprising hardware checkpoint support to responsively save an execution state of an application executed by the processor; a checkpoint interface module to monitor for an occurrence of a checkpoint event during execution of the application; and a checkpoint support module to cause the hardware checkpoint support to save the execution state of the application in response to the occurrence of the checkpoint event during execution of the application, wherein the execution state is indicative of a virtual memory state of the application.

Example 2 includes the subject matter of Example 1, and further including a hardware event monitor, wherein to monitor for the occurrence of the checkpoint event comprises to receive a checkpoint event generated by the hardware event monitor.

Example 3 includes the subject matter of any of Examples 1 and 2, and wherein the checkpoint event comprises a write to a predefined memory address range, or a network I/O event.

Example 4 includes the subject matter of any of Examples 1-3, and wherein the processor further comprises the hardware event monitor.

Example 5 includes the subject matter of any of Examples 1-4, and wherein the checkpoint event comprises a last-level cache access.

Example 6 includes the subject matter of any of Examples 1-5, and wherein to encounter the checkpoint event comprises to monitor for the occurrence of a timer event.

Example 7 includes the subject matter of any of Examples 1-6, and further including a cache memory, wherein to save the execution state of the application comprises to save the execution state of the application to the cache memory.

Example 8 includes the subject matter of any of Examples 1-7, and wherein the cache memory comprises a nonvolatile cache memory.

Example 9 includes the subject matter of any of Examples 1-8, and wherein the checkpoint support module is further to cause the hardware checkpoint support to load the saved execution state of the application into a virtual memory space of the application; and the processor is further to resume execution of the application from the saved execution state in response to loading of the saved execution state.

Example 10 includes the subject matter of any of Examples 1-9, and further including a cache memory, wherein to load the saved execution state comprises to load the saved execution state from the cache memory.

Example 11 includes the subject matter of any of Examples 1-10, and wherein the cache memory comprises a nonvolatile cache memory.

Example 12 includes the subject matter of any of Examples 1-11, and wherein the checkpoint interface module is further to execute a system hook to invoke the hardware checkpoint support in response to the occurrence of the checkpoint event.

Example 13 includes the subject matter of any of Examples 1-12, and wherein to execute the system hook comprises to execute a system call.

Example 14 includes the subject matter of any of Examples 1-13, and wherein to execute the system hook comprises to execute a processor instruction.

Example 15 includes the subject matter of any of Examples 1-14, and wherein to execute the system hook comprises to generate a hardware interrupt.

Example 16 includes the subject matter of any of Examples 1-15, and wherein the application comprises a process, a thread, a virtual machine, or a virtualized application.

Example 17 includes a method for hardware-assisted application checkpointing, the method comprising executing an application by a computing device having a processor including hardware checkpoint support configured to responsively save an execution state of an executed application; encountering, by the computing device, an occurrence of a checkpoint event while executing the application; and saving, by the computing device, an execution state of the application using the hardware checkpoint support of the processor in response to encountering the occurrence of the checkpoint event, wherein the execution state is indicative of a virtual memory state of the application.

Example 18 includes the subject matter of Example 17, and wherein encountering the occurrence of the checkpoint event comprises receiving a checkpoint event generated by a hardware event monitor of the computing device.

Example 19 includes the subject matter of any of Examples 17 and 18, and wherein the checkpoint event comprises a write to a predefined memory address range, or a network I/O event.

Example 20 includes the subject matter of any of Examples 17-19, and wherein receiving the checkpoint event generated by the hardware event monitor comprises receiving a checkpoint event generated by a hardware event monitor of a processor of the computing device.

Example 21 includes the subject matter of any of Examples 17-20, and wherein the checkpoint event comprises a last-level cache access.

Example 22 includes the subject matter of any of Examples 17-21, and wherein encountering the occurrence of the checkpoint event comprises encountering a timer event.

Example 23 includes the subject matter of any of Examples 17-22, and wherein saving the execution state of the application comprises saving the execution state of the application to a cache memory of the computing device.

Example 24 includes the subject matter of any of Examples 17-23, and wherein saving the execution state of the application to the cache memory comprises saving the execution state to a nonvolatile cache memory of the computing device.

Example 25 includes the subject matter of any of Examples 17-24, and further including loading, by the computing device, the saved execution state of the application into a virtual memory space of the application using the hardware checkpoint support of the processor; and resuming, by the computing device, execution of the application from the saved execution state in response to loading the saved execution state.

Example 26 includes the subject matter of any of Examples 17-25, and wherein loading the saved execution state comprises loading the saved execution state from a cache memory of the computing device.

Example 27 includes the subject matter of any of Examples 17-26, and wherein loading the saved execution state from the cache memory comprises loading the execution state from a nonvolatile cache memory of the computing device.

Example 28 includes the subject matter of any of Examples 17-27, and further including executing, by the computing device, a system hook to invoke the hardware checkpoint support in response to encountering the occurrence of the checkpoint event.

Example 29 includes the subject matter of any of Examples 17-28, and wherein executing the system hook comprises executing a system call.

Example 30 includes the subject matter of any of Examples 17-29, and wherein executing the system hook comprises executing a processor instruction.

Example 31 includes the subject matter of any of Examples 17-30, and wherein executing the system hook comprises generating a hardware interrupt.

Example 32 includes the subject matter of any of Examples 17-31, and wherein executing the application comprises executing a process, a thread, a virtual machine, or a virtualized application.

Example 33 includes a computing device comprising a processor; and a memory having stored therein a plurality of instructions that when executed by the processor cause the computing device to perform the method of any of Examples 17-32.

Example 34 includes one or more machine readable storage media comprising a plurality of instructions stored thereon that in response to being executed result in a computing device performing the method of any of Examples 17-32.

Example 35 includes a computing device comprising means for performing the method of any of Examples 17-32.

Example 36 includes a computing device for hardware-assisted application checkpointing, the computing device having a processor including hardware checkpoint support configured to responsively save an execution state of an executed application, the computing device comprising means for executing an application by the computing device; means for encountering, by the computing device, an occurrence of a checkpoint event while executing the application; and means for saving, by the computing device, an execution state of the application using the hardware checkpoint support of the processor in response to encountering the occurrence of the checkpoint event, wherein the execution state is indicative of a virtual memory state of the application.

Example 37 includes the subject matter of Example 36, and wherein the means for encountering the occurrence of the checkpoint event comprises means for receiving a checkpoint event generated by a hardware event monitor of the computing device.

Example 38 includes the subject matter of any of Examples 36 and 37, and wherein the checkpoint event comprises a write to a predefined memory address range, or a network I/O event.

Example 39 includes the subject matter of any of Examples 36-38, and wherein the means for receiving the checkpoint event generated by the hardware event monitor comprises means for receiving a checkpoint event generated by a hardware event monitor of a processor of the computing device.

Example 40 includes the subject matter of any of Examples 36-39, and wherein the checkpoint event comprises a last-level cache access.

Example 41 includes the subject matter of any of Examples 36-40, and wherein the means for encountering the occurrence of the checkpoint event comprises means for encountering a timer event.

Example 42 includes the subject matter of any of Examples 36-41, and wherein the means for saving the execution state of the application comprises means for saving the execution state of the application to a cache memory of the computing device.

Example 43 includes the subject matter of any of Examples 36-42, and wherein the means for saving the execution state of the application to the cache memory comprises means for saving the execution state to a nonvolatile cache memory of the computing device.

Example 44 includes the subject matter of any of Examples 36-43, and further including means for loading, by the computing device, the saved execution state of the application into a virtual memory space of the application using the hardware checkpoint support of the processor; and means for resuming, by the computing device, execution of the application from the saved execution state in response to loading the saved execution state.

Example 45 includes the subject matter of any of Examples 36-44, and wherein the means for loading the saved execution state comprises means for loading the saved execution state from a cache memory of the computing device.

Example 46 includes the subject matter of any of Examples 36-45, and wherein the means for loading the saved execution state from the cache memory comprises means for loading the execution state from a nonvolatile cache memory of the computing device.

Example 47 includes the subject matter of any of Examples 36-46, and further including means for executing, by the computing device, a system hook to invoke the hardware checkpoint support in response to encountering the occurrence of the checkpoint event.

Example 48 includes the subject matter of any of Examples 36-47, and wherein the means for executing the system hook comprises means for executing a system call.

Example 49 includes the subject matter of any of Examples 36-48, and wherein the means for executing the system hook comprises means for executing a processor instruction.

Example 50 includes the subject matter of any of Examples 36-49, and wherein the means for executing the system hook comprises means for generating a hardware interrupt.

Example 51 includes the subject matter of any of Examples 36-50, and wherein the means for executing the application comprises means for executing a process, a thread, a virtual machine, or a virtualized application.

The invention claimed is:

1. A computing device for hardware-assisted application checkpointing, the computing device comprising:
   a processor comprising hardware checkpoint support to responsively save an execution state of an application executed by the processor;
   a checkpoint interface module to monitor for an occurrence of a checkpoint event during execution of the application; and
   a checkpoint support module to cause the hardware checkpoint support to save the execution state of the application in response to the occurrence of the checkpoint event during execution of the application, wherein the execution state is indicative of a virtual memory state of the application.

2. The computing device of claim 1, further comprising a hardware event monitor, wherein to monitor for the occurrence of the checkpoint event comprises to receive a checkpoint event generated by the hardware event monitor.

3. The computing device of claim 2, wherein the processor further comprises the hardware event monitor.

4. The computing device of claim 1, further comprising a cache memory, wherein to save the execution state of the application comprises to save the execution state of the application to the cache memory.

5. The computing device of claim 1, wherein:
   the checkpoint support module is further to cause the hardware checkpoint support to load the saved execution state of the application into a virtual memory space of the application; and
   the processor is further to resume execution of the application from the saved execution state in response to loading of the saved execution state.

6. The computing device of claim 5, further comprising a cache memory, wherein to load the saved execution state comprises to load the saved execution state from the cache memory.

7. The computing device of claim 1, wherein the checkpoint interface module is further to execute a system hook to invoke the hardware checkpoint support in response to the occurrence of the checkpoint event.

8. The computing device of claim 7, wherein to execute the system hook comprises to execute a processor instruction.

9. The computing device of claim 7, wherein to execute the system hook comprises to generate a hardware interrupt.

10. The computing device of claim 1, wherein the application comprises a process, a thread, a virtual machine, or a virtualized application.

11. A method for hardware-assisted application checkpointing, the method comprising:
    executing an application by a computing device having a processor including hardware checkpoint support configured to responsively save an execution state of an executed application;
    encountering, by the computing device, an occurrence of a checkpoint event while executing the application; and
    saving, by the computing device, an execution state of the application using the hardware checkpoint support of the processor in response to encountering the occurrence of the checkpoint event, wherein the execution state is indicative of a virtual memory state of the application.

12. The method of claim 11, wherein encountering the occurrence of the checkpoint event comprises receiving a checkpoint event generated by a hardware event monitor of the computing device.

13. The method of claim 12, wherein receiving the checkpoint event generated by the hardware event monitor comprises receiving a checkpoint event generated by a hardware event monitor of a processor of the computing device.

14. The method of claim 11, wherein saving the execution state of the application comprises saving the execution state of the application to a cache memory of the computing device.

15. The method of claim 11, further comprising executing, by the computing device, a system hook to invoke the hardware checkpoint support in response to encountering the occurrence of the checkpoint event.

16. The method of claim 11, wherein executing the application comprises executing a process, a thread, a virtual machine, or a virtualized application.

17. One or more computer-readable storage media comprising a plurality of instructions that in response to being executed cause a computing device to:
execute an application by the computing device, wherein the computing device has a processor including hardware checkpoint support configured to responsively save an execution state of an executed application;
encounter an occurrence of a checkpoint event while executing the application; and
save an execution state of the application using the hardware checkpoint support of the processor in response to encountering the occurrence of the checkpoint event, wherein the execution state is indicative of a virtual memory state of the application.

18. The one or more computer-readable storage media of claim 17, wherein to encounter the occurrence of the checkpoint event comprises to receive a checkpoint event generated by a hardware event monitor of the computing device.

19. The one or more computer-readable storage media of claim 18, wherein to receive the checkpoint event generated by the hardware event monitor comprises to receive a checkpoint event generated by a hardware event monitor of a processor of the computing device.

20. The one or more computer-readable storage media of claim 17, wherein to save the execution state of the application comprises to save the execution state of the application to a cache memory of the computing device.

21. The one or more computer-readable storage media of claim 17, further comprising a plurality of instructions that in response to being executed cause the computing device to execute a system hook to invoke the hardware checkpoint support in response to encountering the occurrence of the checkpoint event.

22. The one or more computer-readable storage media of claim 17, wherein to execute the application comprises to execute a process, a thread, a virtual machine, or a virtualized application.

* * * * *